United States Patent
Speier

(10) Patent No.: US 10,265,887 B2
(45) Date of Patent: Apr. 23, 2019

(54) MOULD FOR PRODUCING ATOMIZER NOZZLES, MOULD SET, NEGATIVE MOULD AND METHOD FOR PRODUCING AN ATOMIZER NOZZLE

(71) Applicant: Juergen Speier, Reutlingen (DE)

(72) Inventor: Juergen Speier, Reutlingen (DE)

(73) Assignee: LECHLER GMBH, Metzingen (DE)

( * ) Notice: Subject to any disclaimer, the term of this patent is extended or adjusted under 35 U.S.C. 154(b) by 755 days.

(21) Appl. No.: 14/170,711

(22) Filed: Feb. 3, 2014

(65) Prior Publication Data

US 2014/0217640 A1 Aug. 7, 2014

(30) Foreign Application Priority Data

Feb. 4, 2013 (DE) .................. 10 2013 201 785

(51) Int. Cl.
 *B29C 33/00* (2006.01)
 *B22C 9/24* (2006.01)
 *B29C 33/76* (2006.01)
 *B29C 33/30* (2006.01)

(52) U.S. Cl.
 CPC ............ *B29C 33/0022* (2013.01); *B22C 9/24* (2013.01); *B29C 33/30* (2013.01); *B29C 33/76* (2013.01)

(58) Field of Classification Search
 CPC ....... B29C 33/0022; B29C 9/24; B29C 33/42; B29C 45/1775; B29C 45/26; B29C 33/30; B29C 33/76; B29C 33/301
 See application file for complete search history.

(56) References Cited

U.S. PATENT DOCUMENTS

| 4,134,949 | A | * | 1/1979 | McGregor | ............ B29C 31/002 264/296 |
| 4,349,947 | A | * | 9/1982 | Rood | .................. B05B 1/00 228/136 |
| 4,522,775 | A | * | 6/1985 | Briggs | ............... B29B 17/0005 264/171.27 |

(Continued)

FOREIGN PATENT DOCUMENTS

| CH | 5-14 412 | 10/1971 |
| CN | 1835833 A | 9/2006 |

(Continued)

OTHER PUBLICATIONS

English translation of First Office Action issued in Chinese Appln. No. 201410044936.4 dated Oct. 8, 2016 (11 pages).

(Continued)

*Primary Examiner* — Yogendra N Gupta
*Assistant Examiner* — Emmanuel S Luk
(74) *Attorney, Agent, or Firm* — Flynn Thiel, P.C.

(57) ABSTRACT

A mold for producing atomizer nozzles, wherein a mouthpiece core mold part defines an inner wall of the mouthpiece, at least in the region of a transition between the mouthpiece and the flow chamber, and is of integral design, wherein the flow chamber core mold part has a substantially smooth surface and continuous contours in the region of the transition from the flow chamber to the mouthpiece, and wherein the mouthpiece core mold part is placed against the flow chamber core mold part at the transition between the flow chamber and the mouthpiece.

20 Claims, 3 Drawing Sheets

(56) References Cited

U.S. PATENT DOCUMENTS

| | | | |
|---|---|---|---|
| 5,840,350 A * | 11/1998 | Salemi | B29C 49/48 264/537 |
| 6,425,752 B1 * | 7/2002 | Check | B29C 33/3828 249/79 |
| 6,911,170 B2 | 6/2005 | Speier et al. | |
| 7,284,713 B2 * | 10/2007 | Geser | A61M 11/00 239/290 |
| 7,387,752 B2 | 6/2008 | Canova et al. | |
| 7,458,795 B2 | 12/2008 | Seres, Jr. et al. | |
| 7,841,855 B2 | 11/2010 | Gunther et al. | |
| 2002/0003199 A1 * | 1/2002 | Check | B29C 45/73 249/79 |
| 2002/0018825 A1 * | 2/2002 | Starkey | B29C 45/401 425/444 |
| 2002/0180100 A1 | 12/2002 | Speier et al. | |
| 2006/0006589 A1 | 1/2006 | Canova et al. | |
| 2007/0202210 A1 | 8/2007 | Seres, Jr. et al. | |
| 2008/0226764 A1 | 9/2008 | Gunther et al. | |
| 2008/0241540 A1 | 10/2008 | Canova | |

FOREIGN PATENT DOCUMENTS

| | | |
|---|---|---|
| CN | 101043990 A | 9/2007 |
| CN | 101495287 A | 7/2009 |
| DE | 28 36 096 | 3/1980 |
| DE | 101 27 597 C1 | 11/2002 |
| GB | 391 034 | 4/1933 |
| GB | 1 276 731 | 6/1972 |
| GB | 2 030 509 A | 4/1980 |

OTHER PUBLICATIONS

Office Action of the German Patent Office issued in German Application No. 10 2013 201 785.5 dated Dec. 4, 2013 (4 pages).

* cited by examiner

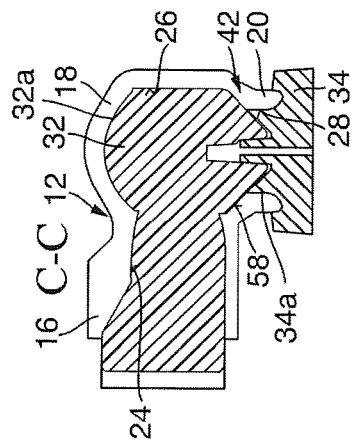
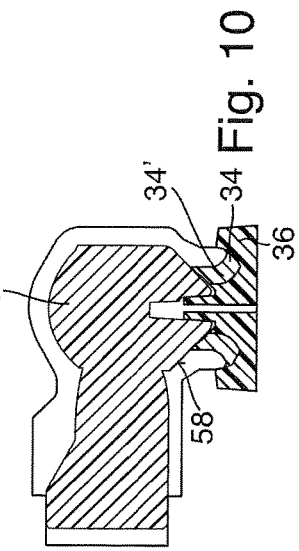
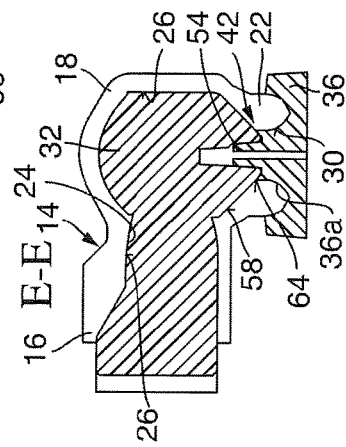
Fig. 7
Fig. 10
Fig. 13
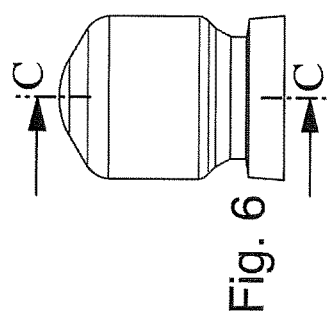
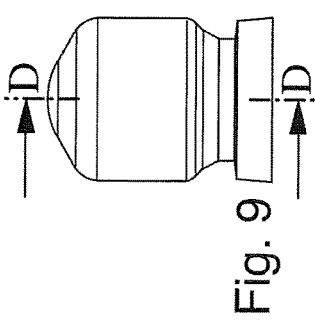
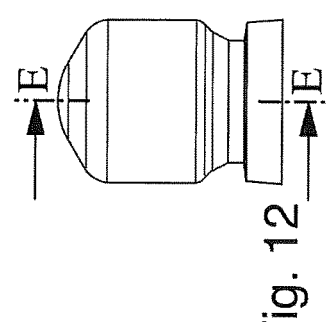
Fig. 6
Fig. 9
Fig. 12
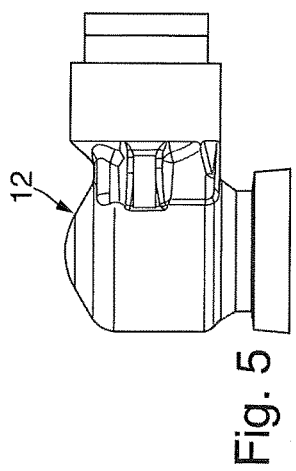
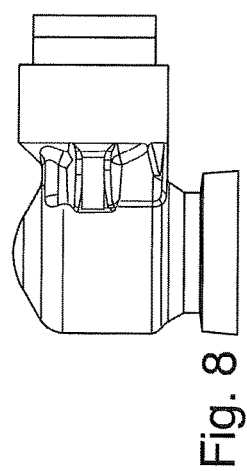
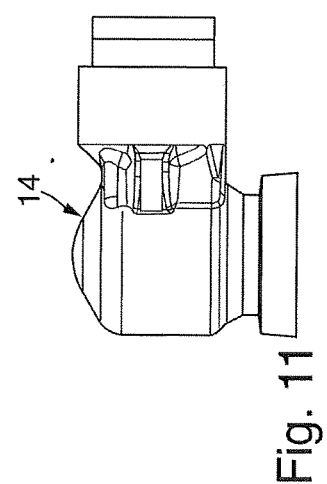
Fig. 5
Fig. 8
Fig. 11

MOULD FOR PRODUCING ATOMIZER NOZZLES, MOULD SET, NEGATIVE MOULD AND METHOD FOR PRODUCING AN ATOMIZER NOZZLE

CROSS-REFERENCE TO RELATED APPLICATION

This claims priority from German Application No. 10 2013 201 785.5, filed on Feb. 4, 2013, the disclosure of which is hereby incorporated by reference in its entirety.

FIELD AND BACKGROUND OF THE INVENTION

The invention relates to a mould for producing atomizer nozzles, which has at least one flow chamber and at least one mouthpiece adjoining the latter and having a narrower cross section than the flow chamber for the emergence of the liquid to be atomized, wherein the mould has multiple parts and has a cavity which corresponds in negative form to the outside and inside dimensions of the atomizer nozzles and is filled with liquid or thixotropic production material, which is then made to solidify, wherein the mould has at least one flow chamber core mould part for defining an inner wall of the flow chamber and at least one mouthpiece core mould part for defining an inner wall of the mouthpiece.

The invention is intended to improve a mould for producing atomizer nozzles.

SUMMARY OF THE INVENTION

In a mould according to the invention for producing atomizer nozzles, it is envisaged that the mouthpiece core mould part defines an inner wall of the mouthpiece, at least in the region of a transition between the mouthpiece and the flow chamber, and is of integral design, that the flow chamber core mould part has a substantially smooth surface and continuous contours in the region of the transition from the flow chamber to the mouthpiece, and that the mouthpiece core mould part is placed against the flow chamber core mould part at the transition between the flow chamber and the mouthpiece. Here, substantially smooth means that the flow chamber core mould part does not have any edges or grooves in the region of the transition from the flow chamber to the mouthpiece. Here, continuous contours means that the flow chamber core mould part has a contour without offsets, edges or grooves in the region of the transition from the flow chamber to the mouthpiece, when viewed in cross section. By virtue of such a design of the surface of the flow chamber core mould part in the region of the transition from the flow chamber to the mouthpiece, the mouthpiece core mould part can be mounted in various positions on the surface of the flow chamber core mould part. The position of an edge or transition between the mouthpiece and the flow chamber relative to the surface of the flow chamber core mould part can thereby be modified. This makes it possible to use different mouthpiece core mould parts with the same flow chamber core mould part. Given appropriate configuration of the end of the mouthpiece core mould part which is placed against the surface of the flow chamber core mould part, it is possible here to achieve high-precision configuration of the transition between the flow chamber and the mouthpiece at the inner wall of the atomizer nozzle. More specifically, the mouthpiece core mould part can be placed against the flow chamber core mould part in such a way that a defined radius of an edge at the inner wall between the flow chamber and the mouthpiece of the atomizer nozzle can be achieved. The quite considerable advantage of such a configuration of the mould according to the invention is that the same size of flow chamber core mould part can be used to produce different nozzles, namely by means of different mouthpiece core mould parts. The flow chamber core mould parts are usually produced from polystyrene, and very expensive tools are required to produce the flow chamber core mould parts, which serve as a "lost mould". According to the invention, the flow chamber core mould part can now be used for different sizes of atomizer nozzle. Overall, this makes the production of a mould for the atomizer nozzles and hence also the production of the atomizer nozzles themselves significantly less expensive. The mould according to the invention is used specifically to produce ceramic nozzles, the ceramic compound being in the form of a thixotropic compound being introduced into the mould and then being made to solidify. The mould configuration according to the invention has given very good results in the production of atomizer nozzles, especially those made of ceramic material, and specifically it has been possible to significantly minimize the outlay for finishing work on the solidified atomizer nozzle blanks.

As a development of the invention, the mouthpiece core mould part defines an inner wall of the mouthpiece from the region of the transition between the mouthpiece and the flow chamber to an outlet edge.

This enables the inner wall of the mouthpiece to be specified very precisely.

As a development of the invention, the mouthpiece core mould part has, at the end thereof which is placed against the flow chamber core mould part, an encircling projection tapering or tapering sharply to an encircling edge.

Such a projection is placed against the flow chamber core mould part by means of the encircling edge. Despite the substantially smooth surface of the flow chamber core mould part in the region of the transition between the flow chamber and the mouthpiece, this makes it possible to achieve snug and defined contact between the mouthpiece core mould part and the flow chamber core mould part. As a result, the transition between the flow chamber and the mouthpiece can be formed precisely and in a defined manner when the mould is filled with liquid or thixotropic production material. The tapering projection has an angle of less than 90° between the surfaces which run toward the sharp encircling edge and form the projection. Reliable contact between the encircling edge and the flow chamber core mould part can thereby be ensured.

As a development of the invention, the encircling edge is formed by the intersection of an outer surface of the mouthpiece core mould part and a bearing surface, wherein the outer surface defines an inner wall of the mouthpiece, at least in the region of the transition from the flow chamber to the mouthpiece, and wherein the bearing surface is formed substantially parallel to the surface of the flow chamber core mould part in the region of the transition between the flow chamber and the mouthpiece.

Arranging the bearing surface parallel to the outer surface of the flow chamber core mould part leads to good results, especially if the mouthpiece core mould part is placed under preload against the flow chamber core mould part, thus allowing the bearing surface, which must then be dimensioned accordingly, to make full surface contact with the flow chamber core mould part.

As a development of the invention, the encircling edge is formed by the intersection of an outer surface of the mouthpiece core mould part and a bearing surface, wherein the outer surface defines an inner wall of the mouthpiece, at least in the region of the transition from the flow chamber to the mouthpiece, and wherein the bearing surface is arranged at a slightly steeper angle than the outer surface of the flow chamber core mould part in the region of the transition between the flow chamber and the mouthpiece, with the result that a clearance is formed between the mouthpiece core mould part and the flow chamber core mould part, where the mouthpiece core mould part is placed against the flow chamber core mould part without a preload, and the clearance increases along the bearing surface from the encircling edge.

In other words, the mouthpiece core mould part has an undercut, with the result that the bearing surface rests in full surface contact and therefore with a sealing action on the flow chamber core mould part, even if there are manufacturing tolerances in the mouthpiece core mould part or the flow chamber core mould part. The design according to the invention has the effect that, without the application of a preload, only the encircling edge of the mouthpiece core mould part rests against the flow chamber core mould part. If a preload is then applied, it is possible to ensure that the mouthpiece core mould part rests with a reliable sealing action on the flow chamber core mould part along the encircling edge. It is thereby possible to ensure that the transition between the flow chamber and the mouthpiece, which is of importance for the flow profile, is formed in a precisely defined way after the filling of the mould with liquid or thixotropic production material for the atomizer nozzle.

As a development of the invention, the mouthpiece core mould part has, at the end thereof which is placed against the flow chamber core mould part, an encircling nose, which extends in the direction of the flow chamber core mould part and which presses into the flow chamber core mould part when the mouthpiece core mould part is placed against the flow chamber core mould part.

By means of an encircling nose extending in the direction of the flow chamber core mould part, it is possible to ensure that, when the mouthpiece core mould part is placed against the flow chamber core mould part, the encircling nose presses into the flow chamber core mould part. This results in a sealed transition between the mouthpiece core mould part and the flow chamber core mould part. Since the flow chamber core mould part is generally composed of foam material, e.g. polystyrene or rigid foam, the pressing in of the encircling nose can be ensured. It is possible, for example, to make the region of the encircling nose from a somewhat harder material than the rest of the mouthpiece core mould part by means of a reinforcing ring. This too contributes to the encircling nose pressing reliably into the flow chamber core mould part when the mouthpiece core mould part is placed against the flow chamber core mould part.

As a development of the invention, the flow chamber core mould part is of conical or frustoconical design in the region of the transition from the flow chamber to the mouthpiece.

Such a conical or frustoconical design of the flow chamber core mould part makes it possible to place mouthpiece core mould parts of different diameters against the flow chamber core mould part with a reliable sealing action. Since the angle of taper of the flow chamber core mould part is constant over a certain region, the same bearing surface geometries can be used in each case, even for mouthpiece core mould parts of different diameters, and it is possible, for example, to select a constant preload with which the mouthpiece core mould part is preloaded against the flow chamber core mould part, even for mouthpiece core mould parts of different sizes.

As a development of the invention, the mouthpiece core mould part has a frustoconical bearing surface at the end thereof which is placed against the flow chamber core mould part.

Such a frustoconical bearing surface can be placed in a sealing manner against the frustoconical surface of the flow chamber core mould part. The frustoconical bearing surface of the mouthpiece core mould part can have an angle of taper which is identical to or slightly steeper than that of the flow chamber core mould part, thus enabling the mouthpiece core mould part to be placed against the flow chamber core mould part with a reliable sealing action, if appropriate with the application of a certain preload.

As a development of the invention, the mouthpiece core mould part is composed of harder material than the flow chamber core mould part, at least in the region of the transition between the flow chamber and the mouthpiece.

It is thereby possible to ensure that the mouthpiece core mould part presses into the flow chamber core mould part by a certain amount when a preload is applied and, as a result, not only reliable sealing but also the production of a precisely defined edge of the atomizer nozzle at the transition between the flow chamber and the mouthpiece can be achieved.

As a development of the invention, the flow chamber core mould part and the mouthpiece core mould part are provided with at least one projection and with at least one recess matching the projection, in particular with mutually matching teeth, wherein the projection and the recess engage in one another when the mouthpiece core mould part is placed against the flow chamber core mould part.

In this way, a precisely defined alignment of the mouthpiece core mould part and the flow chamber core mould part can be ensured. For example, the projection and the recess can be designed as a cylindrical or slightly conical peg and a matching recess. The peg can then be penetrated, for example, by a screw, which extends through the mouthpiece core mould part and is anchored in the flow chamber core mould part in order to apply a certain preload between the mouthpiece core mould part and the flow chamber core mould part.

As a development of the invention, the flow chamber core mould part and the mouthpiece core mould part are provided with matching latching means, wherein the latching means engage in one another when the mouthpiece core mould part is placed against the flow chamber core mould part.

By means of such latching means, e.g. spring latching hooks or projections and recesses in the manner of a bayonet catch, it is possible to ensure that the mouthpiece core mould part is anchored reliably on the flow chamber core mould part and, at the same time, that a defined preload is applied.

According to the invention, a mould set having a mould according to the invention, which has a flow chamber core mould part and a first mouthpiece core mould part, and a further mouthpiece core mould part, which has a different diameter from the first mouthpiece core mould part, at least in the region of the end thereof which is placed against the flow chamber core mould part, is also provided.

By means of such a mould set, it is possible to produce different atomizer nozzles while using the same flow chamber core mould parts, the atomizer nozzles then differing in the inside diameter of the mouthpiece. Since the flow chamber core mould parts used to produce such different atomizer nozzles are identical, production costs for the atomizer nozzles can be considerably reduced.

According to the invention, a negative mould for producing a flow chamber core mould part according to the invention and/or a mouthpiece core mould part according to the invention is also provided.

Negative moulds for producing flow chamber core mould parts and/or mouthpiece core mould parts are very complex to produce and therefore expensive. The fact that, according to the invention, identical flow chamber core mould parts can be used to produce different atomizer nozzles thereby considerably lowers tool costs in the production of the required negative moulds.

According to the invention, a method for producing an atomizer nozzle by means of a mould according to the invention is also provided, in which the application of a preload between the mouthpiece core mould part and the flow chamber core mould part when the mouthpiece core mould part is placed against the flow chamber core mould part and maintenance of the preload during the filling of the mould with liquid or thixotropic production material are provided.

The application of a preload is a simple way of enabling reliable sealing between the mouthpiece core mould part and the flow chamber core mould part and thereby the precise shaping of a transition between the flow chamber and the mouthpiece during the production of an atomizer nozzle.

As a development of the invention, the slight pressing in of an encircling edge on the mouthpiece core mould part into the material of the flow chamber core mould part at the transition between the flow chamber and the mouthpiece when the mouthpiece core mould part is placed against the flow chamber core mould part is envisaged, wherein the encircling edge is formed by the intersection of an outer surface of the mouthpiece core mould part and a bearing surface of the mouthpiece core mould part.

The slight pressing in of the encircling edge ensures reliable sealing and can neutralize manufacturing tolerances of the mouthpiece core mould part and of the flow chamber core mould part. The damaging of the flow chamber core mould part by the pressing in of the mouthpiece core mould part is unproblematic here since the flow chamber core mould part is in any case conceived as a lost mould and is destroyed after the solidification of the production material for the atomizer nozzle, e.g. by being burned out.

Further features and advantages of the invention will become apparent from the claims and from the following description of preferred embodiments of the invention in conjunction with the drawings. Individual features shown in the drawings and individual features of the various embodiments can be combined with one another here in any desired manner without exceeding the scope of the invention.

BRIEF DESCRIPTION OF THE DRAWINGS

FIG. 5 shows a side view of an atomizer nozzle having a flow chamber core mould part and a mouthpiece core mould part, FIG. 6 shows a front view of the arrangement in FIG. 5, FIG. 7 shows a view of section plane C-C in FIG. 6, FIG. 8 shows an arrangement corresponding to FIG. 5, FIG. 9 shows an arrangement corresponding to FIG. 6, FIG. 10 shows a view of section plane D-D in FIG. 9, wherein two different mouthpiece core mould parts are depicted in this sectioned view for the sake of clarity, FIG. 11 shows an atomizer nozzle having a flow chamber core mould part and a mouthpiece core mould part in accordance with another embodiment of the invention, FIG. 12 shows a front view of the arrangement in FIG. 11, FIG. 13 shows a view of section plane E-E in FIG. 12.

DETAILED DESCRIPTION

Figure 1:
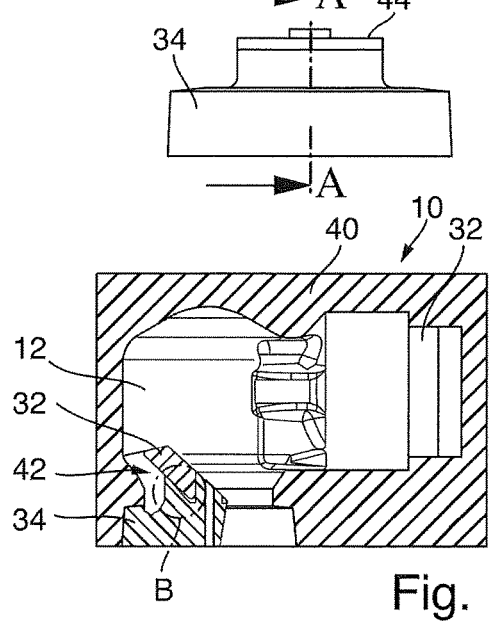
FIG. 1 shows a partially sectioned view of a mould according to the invention for producing an atomizer nozzle.

The illustration in FIG. 1 shows a mould 10 according to the invention for producing an atomizer nozzle 12. The outlines of atomizer nozzles 12, 14 produced using the mould 10 are most easily seen in the sectioned views in FIG. 7 and FIG. 13. FIG. 7 shows an atomizer nozzle 12 in section, and FIG. 13 shows an atomizer nozzle 14 in section. Atomizer nozzle 12 can also be seen in part in the illustration in FIG. 5 and FIG. 6, and atomizer nozzle 14 can be seen in part in FIG. 11 and FIG. 12. The atomizer nozzles 12, 14 each have an inlet chamber region 16 and a flow chamber region 18 as well as a mouthpiece region 20 or 22. The characteristics of the atomizer nozzles 12, 14 are determined by the configuration of the respective inner wall thereof, i.e. an inlet wall 24 within the inlet region 16, a flow chamber wall 26 within the flow region 18, a mouthpiece wall 28 within the mouthpiece region 20 and a mouthpiece wall 30 within the mouthpiece region 22. Here, the wall 24 of the inlet region 16 and the wall 26 of the flow region 18 are defined by an outer wall 32a of a flow chamber core mould part 32. In the embodiment shown in FIG. 7, the wall 28 of mouthpiece region 20 is defined by an outer wall 34a of a mouthpiece core mould part 34, and in the embodiment of FIG. 13 the wall 30 of mouthpiece region 22 is defined by an outer wall 36a of a different mouthpiece core mould part 36. A comparison of FIGS. 7 and 13 will show that the atomizer nozzles 12, 14 each have identical inlet walls 24 and identical flow chamber walls 26, but differ in the configuration of their respective mouthpiece walls 28 and 30. More specifically, the mouthpiece wall 28 of atomizer nozzle 12 has a larger inside diameter than the mouthpiece wall 30 of atomizer nozzle 14.

In FIG. 1, atomizer nozzle 12 is shown partially in section within the mould 10. The mould 10 has an outer mould 40, which in negative form defines the outside dimensions of atomizer nozzle 12. Inserted into the outer mould 40 are the flow chamber core mould part 32 and the mouthpiece core mould part 34 which, in turn, define in negative form the inside dimensions of atomizer nozzle 12, cf. FIG. 7. An interspace between the outer mould 40 and the flow chamber core mould part 32 and mouthpiece core mould part 34 is filled with a liquid or thixotropic production material, e.g. a ceramic material, to produce an atomizer nozzle. The production material is then made to solidify. After the removal of the outer mould 40, which has multiple parts, for example, the mouthpiece core mould part 34 can then be removed. The flow chamber core mould part 32 is designed as a lost mould and is burned out, for example, if appropriate during the firing of the production material.

The mould 10 according to the invention is characterized in that the flow chamber core mould part 32 has a substantially smooth surface and continuous contours in the region of the transition 42 between the flow chamber wall and the mouthpiece wall. In the embodiment illustrated, the surface of the flow chamber core mould part 32 is of conical design in the region of the transition 42. The mouthpiece core mould part 34 is placed against the flow chamber core mould part 32 in the region of the transition 42. As can be seen in FIG. 1, the mouthpiece core mould part 34 is placed against the flow chamber core mould part 32 in such a way that an encircling edge 44 of the mouthpiece core mould part 34 rests in a sealing manner against the surface of the flow chamber core mould part 32 and thereby defines an edge at the transition 42 between the flow chamber wall 26 and the mouthpiece wall 28, 30.

Figure 2:
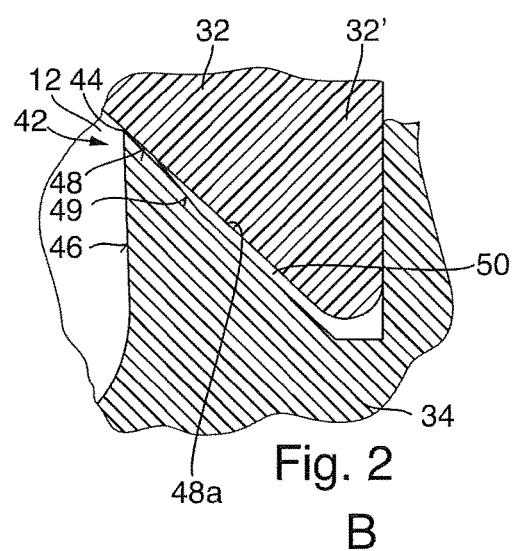
FIG. 2 shows an enlarged illustration of the detail B in FIG. 1.

FIG. 2 shows the detail B in FIG. 1 on an enlarged scale. More specifically, FIG. 2 shows that the encircling edge 44 of the mouthpiece core mould part 34 is formed by the intersection of an outer surface 46 of the mouthpiece core mould part 34 and a bearing surface 48 of the mouthpiece core mould part 34. The bearing surface 48 is of encircling design and of frustoconical design and defines a recess 48a of the mouthpiece core mould part 34 which opens towards the flow chamber core mould part 32 and into which an end portion 32' of the flow chamber core mould part 32 projects. The bearing surface 48 is formed parallel to the frustoconical surface of the flow chamber core mould part 32 at the transition 42. As a result, the bearing surface 48 rests flat against the surface of the flow chamber core mould part 32 and, in particular, there is no interspace between the encircling edge 44 and the surface of the flow chamber core mould part 32. As a result, the production material cannot pass between the mouthpiece core mould part 34 and the flow chamber core mould part 32 as the mould is filled with liquid or thixotropic production material. As a result, the atomizer nozzle 12 has a precisely defined geometry and, specifically, a defined, sharp encircling edge in the region of the transition 42.

The mouthpiece core mould part 34 can be preloaded in the direction of the flow chamber core mould part 32 in order to ensure that the bearing surface 48 and the edge 44 rest against the flow chamber core mould part 32 in a sealing manner over the entire circumference. It is even possible here to make provision for the bearing surface 48 and the edge 44 to press into the flow chamber core mould part 32 by a certain amount, although this is not shown in FIG. 2. It is thereby possible to compensate for tolerances in the production of the flow chamber core mould part 32 and of the mouthpiece core mould part 34. It is expedient here if the mouthpiece core mould part 34 is composed of a harder material than the flow chamber core mould part 32. The damage to the flow chamber core mould part 32 due to the pressing in of the encircling edge 44 and of the bearing surface 48 is of no significance here since the flow chamber core mould part 32 is in any case conceived as a lost mould.

From FIG. 2 it can furthermore be seen that, when viewed inwards from the bearing surface in the circumferential direction, a cavity 50 is provided between the flow chamber core mould part 32 and the mouthpiece core mould part 34, said cavity being formed by an undercut on the mouthpiece core mould part 34 radially on the inside of the bearing surface 48. This undercut or the cavity 50 ensures that the mouthpiece core mould part 34 rests on the flow chamber core mould part 32 only by means of the bearing surface 48 in the region of its outer circumference. As a result, reliable sealing of the mouthpiece core mould part 34 and the flow chamber core mould part 32 can be ensured.

Figure 3:
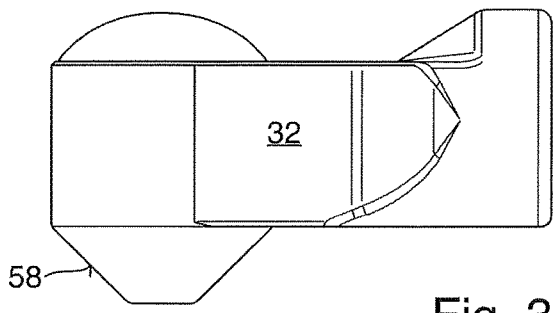
FIG. 3 shows a side view of a flow chamber core mould part and of a mouthpiece core mould part of the mould in FIG. 1.

The illustration in FIG. 3 shows a side view of the mouthpiece core mould part 34 and of the flow chamber core mould part 32 in the disassembled state.

Figure 4:
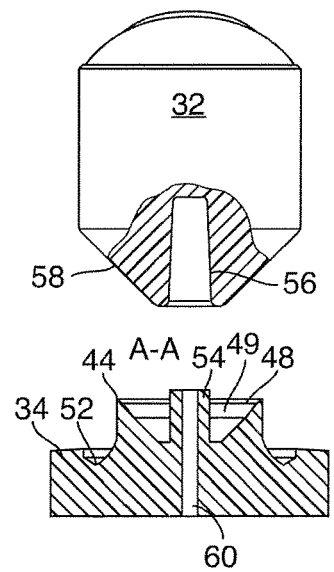
FIG. 4 shows a partially sectioned front view of the flow chamber core mould part and of the mouthpiece core mould part in FIG. 3.
Figure 14:
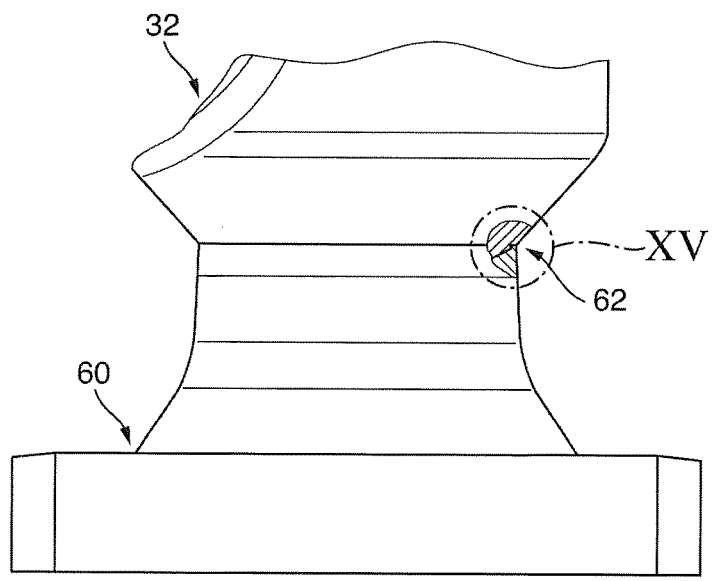
FIG. 14 shows a partial side view of a flow chamber core mould part and of a mouthpiece core mould part in accordance with another embodiment of the invention in the assembled state.
Figure 15:
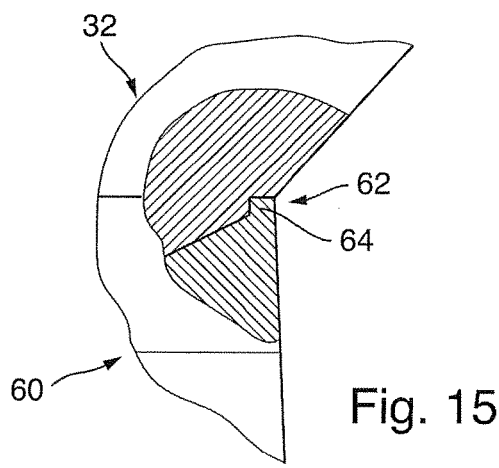
FIG. 15 shows an enlarged illustration of the detail XV in FIG. 14 in the partially sectioned state.

FIG. 4 shows a view of section plane A-A in FIG. 3. The mouthpiece core mould part 34 defines the inner wall 28 of the mouthpiece region 20 between the encircling edge 44 and an outlet edge 52 and thus defines that region of the inner wall 28 of the mouthpiece region 20 which is important for the flow profile within the atomizer nozzle 12. The encircling bearing surface 48 and the undercut 49 provided below the bearing surface 48 in FIG. 2 can furthermore be seen in FIG. 4. The undercut 49 is achieved by selecting a steeper angle of taper for the undercut 49 than for the bearing surface 48. An angle between a central longitudinal axis of the mouthpiece core mould part 34 and the bearing surface 48 is thus greater than an angle between the central longitudinal axis and the undercut 49.

The mouthpiece core mould part 34 is of rotationally symmetrical design and has a concentrically arranged stud 54, which is of frustoconical design and matches a frustoconical recess 56 in the flow chamber core mould part 32. As the mouthpiece core mould part 34 is inserted into the recess 56, the mouthpiece core mould part 34 and the flow chamber core mould part 32 are thereby automatically aligned correctly with respect to one another. The stud 54 of the mouthpiece core mould part 34 is inserted into the recess 56 until the encircling edge 44 and the bearing surface 48 are resting on the conical surface 58 of the flow chamber core mould part 32.

The stud 54 is provided with a central hole 60 which passes through the entire mouthpiece core mould part 34. A screw can be inserted into the central hole 60, and then penetrates the central hole 60 and is screwed into the material of the flow chamber core mould part 32. In this way, a defined preload between the mouthpiece core mould part 34 and the flow chamber core mould part 32 can be set and maintained.

The particular advantage of the invention will be seen from a comparison of FIGS. 7, 10 and 13.

FIG. 7 shows mouthpiece core mould part 34, which is placed against the flow chamber core mould part 32, thereby defining an inner wall of atomizer nozzle 12 with the mouthpiece wall 28.

FIG. 13 shows mouthpiece core mould part 36, which is placed against the flow chamber core mould part 32, thereby defining an inner wall of atomizer nozzle 14 with the mouthpiece wall 30.

In FIG. 10, a further mouthpiece core mould part 34' and the mouthpiece core mould part 36 are placed one above the other in order to illustrate that both mouthpiece core mould part 36 and mouthpiece core mould part 34' can be placed against the flow chamber core mould part 32 in a sealing manner and that mouthpiece core mould part 36 has a significantly smaller diameter than mouthpiece core mould part 34 at the end thereof which is placed against the flow chamber core mould part 32. Here, the substantially smooth contour with a continuous contour profile of the flow chamber core mould part 32, said contour being visible in the cross-sectional views in FIGS. 1, 4, 7, 10 and 14, makes it possible to place each of the different mouthpiece core mould parts 34' and 36 against the surface 58 in a sealing manner. This is because mouthpiece core mould part 36, like mouthpiece core mould part 34', is provided at the end thereof which rests against the surface 58 with an encircling edge 64 and a bearing surface adjoining the encircling edge 64 radially on the inside, the bearing surface likewise being of frustoconical design. Mouthpiece core mould part 36 furthermore has a central stud 54 of identical design to that of mouthpiece core mould part 34, thus allowing it to be centred on the flow chamber core mould part 32 in the same way as mouthpiece core mould part 34.

The substantially smooth surface 58 of flow chamber mould part 32 in the region of the transition 42 between the flow chamber wall 26 and the mouthpiece wall 28 therefore makes it possible to use identical flow chamber core mould parts 32 together with different mouthpiece core mould parts 34, 34', 36 in order thereby to produce atomizer nozzles 12, 14 with different mouthpiece diameters. It can be seen that the surface 58 does not have any edges or grooves, and it can also be seen that the contour of the surface 58 does not have any offsets, edges or grooves. The outer mould 40 in FIG. 1, the flow chamber core mould part 32 and the mouthpiece core mould parts 34, 34', 36 form a mould set for the production of different atomizer nozzles.

As explained, the flow chamber core mould part 32 is conceived as a lost mould, and therefore a flow chamber core mould part 32 has to be produced for the production of each atomizer nozzle 12, 14. The negative moulds for producing the flow chamber core mould parts 32, which are composed of polystyrene for example, are very expensive. Using identical flow chamber core mould parts 32 to produce different atomizer nozzles 12, 14 therefore considerably reduces the costs for producing the moulds 10 and hence also the costs for producing the different atomizer nozzles 12, 14.

The illustration in FIG. 14 shows in part a mouthpiece core mould part 60 and a flow chamber core mould part 32 in the state in which one is placed against the other. The flow chamber core mould part 32 is identical to the flow chamber core mould part already described and will therefore not be described again. The flow chamber core mould part 32 is composed of a foam-type material, e.g. polystyrene or rigid foam.

The mouthpiece core mould part 60 is placed against the flow chamber core mould part 32 and is sealed off with respect to the flow chamber core mould part 32 in the region of an edge 62, ensuring that no material can penetrate between the mouthpiece core mould part 60 and the flow chamber core mould part 32 and thereby forming unwanted flash as the mould is filled.

FIG. 15 shows the detail XV in FIG. 14 in the partially sectioned state on an enlarged scale. It can be seen that the mouthpiece core mould part 60 has an encircling nose 64 on its upper rim, that facing the flow chamber core mould part 32, said nose extending in the direction of the flow chamber core mould part 32. In the state illustrated in FIG. 15, this encircling nose 64 has already penetrated by a certain amount into the material of the flow chamber core mould part 32 and thereby ensures that the edge 62 is sealed off and thus that a sharp but flash-free edge forms on the finished nozzle.

The mouthpiece core mould part 60 is composed of a rubber material, for example, wherein the region of the nose 64 is formed by means of a reinforcing ring, which is mounted on the rest of the mouthpiece core mould part 60. The reinforcing ring can be composed of a somewhat harder material than the mouthpiece core mould part 60 in order, on the one hand, to ensure that it presses into the flow chamber core mould part 32 and, on the other hand, to ensure multiple uses.

The invention claimed is:

1. A mould for producing an atomizer nozzle with a flow chamber defined by a flow chamber inner wall and a mouthpiece chamber defined by a mouthpiece chamber inner wall, the mouthpiece chamber adjoining the flow chamber and having a narrower cross section than the flow chamber for the emergence of liquid to be atomized, the mould having multiple parts and a cavity, the cavity corresponding in negative form to outside and inside dimensions of the atomizer nozzle and being filled with liquid or thixotropic production material thereafter made to solidify, the mould having a flow chamber core mould part defining the flow chamber inner wall and a mouthpiece core mould part defining the mouthpiece chamber inner wall at least in a region of a transition between the mouthpiece chamber and the flow chamber, the flow chamber core mould part having an outer surface with a substantially smooth and continuous contour in the region of the transition between the flow chamber and the mouthpiece chamber, the outer surface defining the flow chamber inner wall, the mouthpiece core mould part having an edge encircling the outer surface of the flow chamber core mould part and being disposed in sealing contact against the substantially smooth and continuous contour of the outer surface of the flow chamber core mould part at the transition between the flow chamber and the mouthpiece chamber, the mouthpiece core mould part having a configuration which tapers in a direction towards the edge of the mouthpiece core mould part.

2. The mould according to claim 1, wherein the mouthpiece core mould part defines the mouthpiece chamber inner wall from the region of the transition between the mouthpiece chamber and the flow chamber to an outlet edge of the mouthpiece chamber from which liquid emerges.

3. The mould according to claim 1, wherein the edge of the mouthpiece core mould part forms an intersection of an outer surface of the mouthpiece core mould part and a bearing surface of the mouthpiece core mould part facing away from the outer surface of the mouthpiece core mould part, the outer surface of the mouthpiece core mould part defining the mouthpiece chamber inner wall and the bearing surface is substantially parallel with the substantially smooth and continuous contour of the outer surface of the flow chamber core mould part in the region of the transition between the mouthpiece chamber and the flow chamber.

4. The mould according to claim 1, wherein the substantially smooth and continuous contour of the outer surface of the flow chamber core mould part disposed in sealing contact with the edge of the mouthpiece core mould part is exposed to contact liquid or thixotropic production material located within the cavity of the mould.

5. The mould according to claim 4, wherein the sealing contact between the edge of the mouthpiece core mould part and the outer surface of the flow chamber core mould part defines a parting line between the mouthpiece core mould part and the flow chamber core mould part, the mouthpiece core mould part defines a central axis corresponding to a direction along which liquid emerges from the mouthpiece chamber, the edge is a radially outermost part of the mouthpiece core mould part at the parting line and the substantially smooth and continuous contour is a radially outermost part of the outer surface of the flow chamber core mould part at the parting line.

6. The mould according to claim 5, wherein the substantially smooth and continuous contour of the outer surface of the flow chamber core mould part extends beyond the parting line.

7. A mould for producing an atomizer nozzle with a flow chamber defined by a flow chamber inner wall and a mouthpiece chamber defined by a mouthpiece chamber inner wall, the mouthpiece chamber adjoining the flow chamber and having a narrower cross section than the flow chamber for the emergence of liquid to be atomized, the mould having multiple parts and a cavity, the cavity corresponding in negative form to outside and inside dimensions of the atomizer nozzle and being filled with liquid or thixotropic production material thereafter made to solidify, the mould having a flow chamber core mould part defining the flow chamber inner wall and a mouthpiece core mould part defining the mouthpiece chamber inner wall at least in a region of a transition between the mouthpiece chamber and the flow chamber, the flow chamber core mould part having an outer surface with a substantially smooth and continuous contour in the region of the transition between the flow chamber and the mouthpiece chamber, the outer surface defining the flow chamber inner wall, the mouthpiece core mould part having an edge encircling the outer surface of the flow chamber core mould part and being disposed in sealing contact against the substantially smooth and continuous contour of the outer surface of the flow chamber core mould part at the transition between the flow chamber and the mouthpiece chamber, the outer surface of the flow chamber core mould part being frustoconical or conical in the region of the transition between the flow chamber and the mouthpiece chamber.

8. The mould according to claim 7, wherein the edge of the mouthpiece core mould part presses into the outer surface of the flow chamber core mould part to achieve the sealing contact.

9. The mould according to claim 7, wherein the mouthpiece core mould part has a frustoconical bearing surface disposed in opposed and contacting relation with the frustoconical or conical outer surface of the flow chamber core mould part.

10. The mould according to claim 7, wherein the flow chamber core mould part and the mouthpiece core mould part are provided with a projection and with a recess matching the projection, the projection engaging within the recess when the mouthpiece core mould part is disposed against the flow chamber core mould part.

11. A mould for producing an atomizer nozzle with a flow chamber defined by a flow chamber inner wall and a mouthpiece chamber defined by a mouthpiece chamber inner wall, the mouthpiece chamber adjoining the flow chamber and having a narrower cross section than the flow chamber for the emergence of liquid to be atomized, the mould having multiple parts and a cavity, the cavity corresponding in negative form to outside and inside dimensions of the atomizer nozzle and being filled with liquid or thixotropic production material thereafter made to solidify, the mould having a flow chamber core mould part defining the flow chamber inner wall and a mouthpiece core mould part defining the mouthpiece chamber inner wall at least in a region of a transition between the mouthpiece chamber and the flow chamber, the flow chamber core mould part having an outer surface with a substantially smooth and continuous contour in the region of the transition between the flow chamber and the mouthpiece chamber, the outer surface defining the flow chamber inner wall, the mouthpiece core mould part having an edge encircling the outer surface of the flow chamber core mould part and being disposed in sealing contact against the substantially smooth and continuous contour of the outer surface of the flow chamber core mould part at the transition between the flow chamber and the mouthpiece chamber, the mouthpiece core mould part being a first mouthpiece core mould part, the mould further including a second mouthpiece core mould part having a different diameter than a diameter of the first mouthpiece core mould part in the region of the sealing contact between the flow chamber core mould part and the first mouthpiece core mould part.

12. A method for producing an atomizer nozzle with a mould having a flow chamber defined by a flow chamber inner wall and a mouthpiece chamber defined by a mouthpiece chamber inner wall, the mouthpiece chamber adjoining the flow chamber and having a narrower cross section than the flow chamber for the emergence of liquid to be atomized, the mould having multiple parts and a cavity, the cavity corresponding in negative form to outside and inside dimensions of the atomizer nozzle and being filled with liquid or thixotropic production material thereafter made to solidify, the mould having a flow chamber core mould part defining the flow chamber inner wall and a mouthpiece core mould part defining the mouthpiece chamber inner wall at least in a region of a transition between the mouthpiece chamber and the flow chamber, the flow chamber core mould part having an outer surface with a substantially smooth and continuous contour in the region of the transition between the flow chamber and the mouthpiece chamber, the outer surface defining the flow chamber inner wall, the mouthpiece core mould part having an edge encircling the outer surface of the flow chamber core mould part and being disposed in sealing contact against the substantially smooth and continuous contour of the outer surface of the flow chamber core mould part at the transition between the flow chamber and the mouthpiece chamber, the edge of the mouthpiece core mould part forming an intersection of an outer surface of the mouthpiece core mould part and an inner bearing surface of the mouthpiece core mould part facing away from the outer surface thereof, the outer surface of the mouthpiece core mould part defining the mouthpiece chamber inner wall from the intersection to an outlet edge of the mouthpiece chamber from which liquid emerges, and the outer and inner surfaces of the mouthpiece core mould part together defining an angle of less than 90 degrees at the edge, the method including applying a preload between the mouthpiece core mould part and the flow chamber core mould part, maintaining the preload during filling of the mould with liquid or thixotropic production material, and slightly pressing the edge of the mouthpiece core mould part into the material of the flow chamber core mould part at the transition between the flow chamber and the mouthpiece chamber and deforming the flow chamber core mould part at the transition.

13. A mould for producing an atomizer nozzle with a flow chamber defined by a flow chamber inner wall and a mouthpiece chamber defined by a mouthpiece chamber inner wall, the mouthpiece chamber adjoining the flow chamber and having a narrower cross section than the flow chamber for the emergence of liquid to be atomized, the mould having multiple parts and a cavity, the cavity corresponding in negative form to outside and inside dimensions of the atomizer nozzle and being filled with liquid or thixotropic production material thereafter made to solidify, the mould having a flow chamber core mould part defining the flow chamber inner wall and a mouthpiece core mould part defining the mouthpiece chamber inner wall at least in a region of a transition between the mouthpiece chamber and the flow chamber, the flow chamber core mould part having an outer surface with a substantially smooth and continuous contour in the region of the transition between the flow chamber and the mouthpiece chamber, the outer surface defining the flow chamber inner wall, the mouthpiece core mould part having an edge encircling the outer surface of the flow chamber core mould part and being disposed in sealing contact against the substantially smooth and continuous contour of the outer surface of the flow chamber core mould part at the transition between the flow chamber and the mouthpiece chamber, the mouthpiece core mould part having an outer surface defining the mouthpiece chamber inner wall of the mouthpiece chamber and an inner surface facing away from the outer surface of the mouthpiece core mould part, the inner surface being oriented transversely relative to the outer surface of the mouthpiece core mould part and defining a recess in the mouthpiece core mould part which opens toward the flow chamber core mould part, the flow chamber core mould part having an end portion extending into the recess beyond the edge of the mouthpiece core mould part, the edge of the mouthpiece core mould part defining an intersection of the outer and inner surfaces of the mouthpiece core mould part, the outer surface of the flow chamber core mould part being a first outer surface and the flow chamber core mould part including a second outer surface defining an exterior surface of the end portion of the flow chamber core mould part, the exterior surface being disposed in facing relation with the inner surface of the mouthpiece core mould part.

14. A mould for producing an atomizer nozzle with a flow chamber defined by a flow chamber inner wall and a mouthpiece chamber defined by a mouthpiece chamber inner wall, the mouthpiece chamber adjoining the flow chamber and having a narrower cross section than the flow chamber for the emergence of liquid to be atomized, the mould having multiple parts and a cavity, the cavity corresponding in negative form to outside and inside dimensions of the atomizer nozzle and being filled with liquid or thixotropic production material thereafter made to solidify, the mould having a flow chamber core mould part defining the flow chamber inner wall and a mouthpiece core mould part defining the mouthpiece chamber inner wall at least in a region of a transition between the mouthpiece chamber and the flow chamber, the flow chamber core mould part having an outer surface with a substantially smooth and continuous contour in the region of the transition between the flow chamber and the mouthpiece chamber, the outer surface defining the flow chamber inner wall, the mouthpiece core mould part having an edge encircling the outer surface of the flow chamber core mould part and being disposed in sealing contact against the substantially smooth and continuous contour of the outer surface of the flow chamber core mould part at the transition between the flow chamber and the mouthpiece chamber, the edge of the mouthpiece core mould part forming an intersection of an outer surface of the mouthpiece core mould part and an inner surface of the mouthpiece core mould part facing away from the outer surface thereof, the outer surface of the mouthpiece core mould part defining the mouthpiece chamber inner wall from the intersection to an outlet edge of the mouthpiece chamber from which liquid emerges, and the outer and inner surfaces of the mouthpiece core mould part together define an angle of less than 90 degrees at the edge.

15. A mold for forming an atomizer nozzle, said mold comprising an outer mold having an inner wall surface defining a cavity corresponding in negative form to outer dimensions of a finished atomizer nozzle, a mouthpiece core mold part and a flow chamber core mold part each disposed within said cavity of said outer mold and each having an outer wall surface opposed to and spaced inwardly from said inner wall surface of said outer mold, said outer wall surfaces together corresponding in negative form to inner dimensions of the finished atomizer nozzle, said mouthpiece core mold part defining a central axis corresponding to a direction along which liquid emerges from the finished atomizer nozzle, said mouthpiece core mold part having an annular edge portion and said outer wall surface of said flow chamber core mold part having an annular area, said annular edge portion of said mouthpiece core mold part being disposed in surrounding relation with said annular area of said outer wall surface of said flow chamber core mold part, part of said annular edge portion being disposed in contacting and sealing relation with part of said annular area to define an annular parting line between said mouthpiece core mold part and said flow chamber core mold part, said part of said annular edge portion being a radially outermost part of said outer wall surface of said mouthpiece core mold part at said annular parting line and said part of said annular area being a radially outermost part of said outer wall surface of said flow chamber core mold part at said annular parting line such that each of said parts are disposed to contact atomizer nozzle production material located between said outer wall surfaces and said inner wall surface of said outer mold, said annular area of said flow chamber core mold part having a smooth and continuous contour.

16. The mold according to claim 15, wherein said smooth and continuous contour is without offsets, edges or grooves, and extends beyond said annular parting line.

17. The mold according to claim 15, wherein said part of said annular edge portion of said mouthpiece core mold part defines a terminal annular edge of said annular edge portion, said terminal annular edge and said part of said annular area of said outer surface of said flow chamber core mold part each have a diameter defined at said annular parting line, the diameter of said terminal annular edge being greater than the diameter of said part of said annular area.

18. The mold according to claim 15, wherein said mouthpiece core mold part has an inner wall surface facing away from said outer wall surface thereof, said inner wall surface of said mouthpiece core mold part defining a recess which opens upwardly toward said flow chamber core mold part, said flow chamber core mold part having an end portion on which said annular area is disposed, said annular area of said end portion having a frustoconical configuration with said smooth and continuous contour extending beyond said annular parting line.

19. The mold according to claim 18, wherein said part of said annular edge portion of said mouthpiece core mold part is a terminal annular edge and defines an intersection between said inner wall surface of said mouthpiece core mold part and said outer wall surface thereof, and said inner wall surface of said mouthpiece core mold part and said outer wall surface thereof together define an angle of less than 90 degrees at said terminal annular edge.

20. The mold according to claim 18, wherein said recess is frustoconical in configuration.

* * * * *